US010478970B2

(12) United States Patent
Hannya et al.

(10) Patent No.: US 10,478,970 B2
(45) Date of Patent: Nov. 19, 2019

(54) ROBOT SYSTEM

(71) Applicant: FANUC CORPORATION, Yamanashi (JP)

(72) Inventors: Tsuyoshi Hannya, Yamanashi (JP);
Hiroaki Yamamoto, Yamanashi (JP);
Takatoshi Iwayama, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 125 days.

(21) Appl. No.: 15/905,029

(22) Filed: Feb. 26, 2018

(65) Prior Publication Data
US 2018/0250824 A1 Sep. 6, 2018

(30) Foreign Application Priority Data

Mar. 3, 2017 (JP) ................................ 2017-039971

(51) Int. Cl.
*B25J 9/16* (2006.01)
(52) U.S. Cl.
CPC ........... *B25J 9/1676* (2013.01); *B25J 9/1694* (2013.01); *Y10S 901/09* (2013.01); *Y10S 901/15* (2013.01); *Y10S 901/46* (2013.01); *Y10S 901/49* (2013.01)
(58) Field of Classification Search
CPC ..... B25J 9/1676; B25J 9/1694; Y10S 901/49; Y10S 901/46; Y10S 901/09; Y10S 901/15
USPC ................................................ 700/245, 253
See application file for complete search history.

(56) References Cited

U.S. PATENT DOCUMENTS

| 5,150,026 | A  | * | 9/1992 | Seraji | B25J 9/1643 |
| | | | | | 318/567 |
| 6,212,443 | B1 | | 4/2001 | Nagata et al. | |
| 7,933,684 | B2 | * | 4/2011 | Sugino | G05D 1/0251 |
| | | | | | 169/52 |
| 8,676,379 | B2 | * | 3/2014 | Okazaki | B25J 9/1676 |
| | | | | | 700/255 |
| 9,943,964 | B2 | * | 4/2018 | Hares | B25J 9/1679 |
| 2004/0205417 | A1 | | 10/2004 | Moridaira et al. | |
| 2006/0049939 | A1 | * | 3/2006 | Haberer | F16P 3/142 |
| | | | | | 340/541 |

(Continued)

FOREIGN PATENT DOCUMENTS

| CN | 104057445 A | 9/2014 |
| EP | 0850730 A1 | 1/1998 |

(Continued)

OTHER PUBLICATIONS

Chinese Office Action dated May 27, 2019, for Chinese Patent Application No. 201810163038.9.

(Continued)

*Primary Examiner* — Jaime Figueroa
(74) *Attorney, Agent, or Firm* — Karceski IP Law, PLLC

(57) ABSTRACT

An object is prevented from being sandwiched between robot arms without the occurrence of unintentional operating restrictions of the robot arms. Provided is a robot system including: a robot body that is provided with at least two links that are relatively moved by at least one joint; a sensor that detects the distances from mutually opposed surfaces of the at least two links to an object inserted between the surfaces; and a control unit that performs an interference avoidance operation if the distances detected by the sensor are less than a predetermined threshold.

5 Claims, 9 Drawing Sheets

(56) References Cited

U.S. PATENT DOCUMENTS

| | | | |
|---|---|---|---|
| 2009/0171505 A1* | 7/2009 | Okazaki | B25J 9/1676 |
| | | | 700/258 |
| 2010/0087955 A1* | 4/2010 | Tsusaka | B25J 9/0003 |
| | | | 700/245 |
| 2010/0318224 A1 | 12/2010 | Okuda et al. | |
| 2011/0184558 A1* | 7/2011 | Jacob | B25J 9/1676 |
| | | | 700/259 |
| 2012/0048027 A1* | 3/2012 | Hashiguchi | B25J 9/0087 |
| | | | 73/763 |
| 2012/0245733 A1* | 9/2012 | Bjorn | B25J 9/1676 |
| | | | 700/253 |
| 2014/0288707 A1 | 9/2014 | Asahi et al. | |
| 2015/0306770 A1 | 10/2015 | Mittal et al. | |
| 2016/0221193 A1 | 8/2016 | Sato | |
| 2016/0346930 A1* | 12/2016 | Hares | B25J 9/1679 |
| 2018/0043549 A1* | 2/2018 | Su | B25J 9/12 |
| 2018/0186005 A1* | 7/2018 | Hares | B25J 9/1679 |

FOREIGN PATENT DOCUMENTS

| | | |
|---|---|---|
| EP | 1396314 A1 | 3/2004 |
| EP | 2781318 A2 | 9/2014 |
| JP | H07049711 A | 2/1995 |
| JP | H09085656 | 3/1997 |
| JP | 2004148493 A | 5/2004 |
| JP | 2008302496 A | 12/2008 |
| JP | 2011093015 A | 5/2011 |
| JP | 2011125975 A | 6/2011 |
| JP | 2012045630 A | 3/2012 |
| JP | 2012076197 A | 4/2012 |
| JP | 2012245575 A | 12/2012 |
| JP | 2013246553 A | 12/2013 |
| JP | 2014037028 | 2/2014 |
| JP | 2015123505 A | 7/2015 |
| JP | 2016144861 | 8/2016 |
| JP | 2016144861 | 12/2016 |
| WO | 2009110242 A1 | 9/2009 |

OTHER PUBLICATIONS

Japanese Office Action dated Oct. 2, 2018, for Japanese Patent Application No. 2017-039971.

Japanese Search Report by Registered Searching Authority dated Oct. 2, 2018, for Japanese Patent Application No. 2017-039971.

* cited by examiner

ROBOT SYSTEM

CROSS-REFERENCE TO RELATED APPLICATIONS

This application is based on and claims priority to Japanese Patent Application No. 2017-039971, filed on Mar. 3, 2017, the entire contents of which are incorporated herein by reference.

FIELD OF THE INVENTION

The present invention relates to a robot system.

BACKGROUND OF THE INVENTION

In the related art, there is a known robot in which a sensor that can detect a small force is mounted at a distal end of a robot arm, and a sensor that can detect a large force is mounted at a joint part of the robot arm, thereby making it possible to detect a wide range of force (for example, see Japanese Unexamined Patent Application, Publication No. 2016-144861).

SUMMARY OF THE INVENTION

An object of the present invention is to provide a robot system capable of preventing an object from being sandwiched between robot arms without the occurrence of unintentional operating restrictions of the robot arms.

According to one aspect, the present invention provides a robot system including: a robot body that is provided with at least two links that are relatively moved by at least one joint; a sensor that detects the distances from mutually opposed surfaces of the at least two links to an object inserted between the surfaces; and a control unit that performs an interference avoidance operation if the distances detected by the sensor are less than a predetermined threshold.

In the above-described aspect, the control unit may be provided with an alarm unit that issues an alarm about an approach between the links and the object, as the interference avoidance operation.

In the above-described aspect, the control unit may perform control so as to restrict the operation of the robot body, as the interference avoidance operation.

In the above-described aspect, the control unit may perform the interference avoidance operation only when the robot body operates the joint in a direction in which the angle between the links is relatively reduced.

In the above-described aspect, the sensor may be provided with: a non-contact distance sensor that is disposed in the vicinity of the joint and that measures the object distance to each position on the surface of the object inserted between the links; and a calculation unit that calculates the distances from the surfaces of the links to the object on the basis of the object distance detected by the distance sensor and the angle of the joint.

In the above-described aspect, the sensor may be formed of non-contact distance sensors that are attached to the surfaces of the links and that measure the distances to respective positions on the surfaces of the object inserted between the links.

In the above-described aspect, the sensor may be formed of a contact sensor that is attached to the surface of at least one of the links and that detects contact with the object inserted between the links.

DESCRIPTION OF EMBODIMENTS OF THE INVENTION

A robot system 1 according to one embodiment of the present invention will be described below with reference to the drawings.

Figure 1:
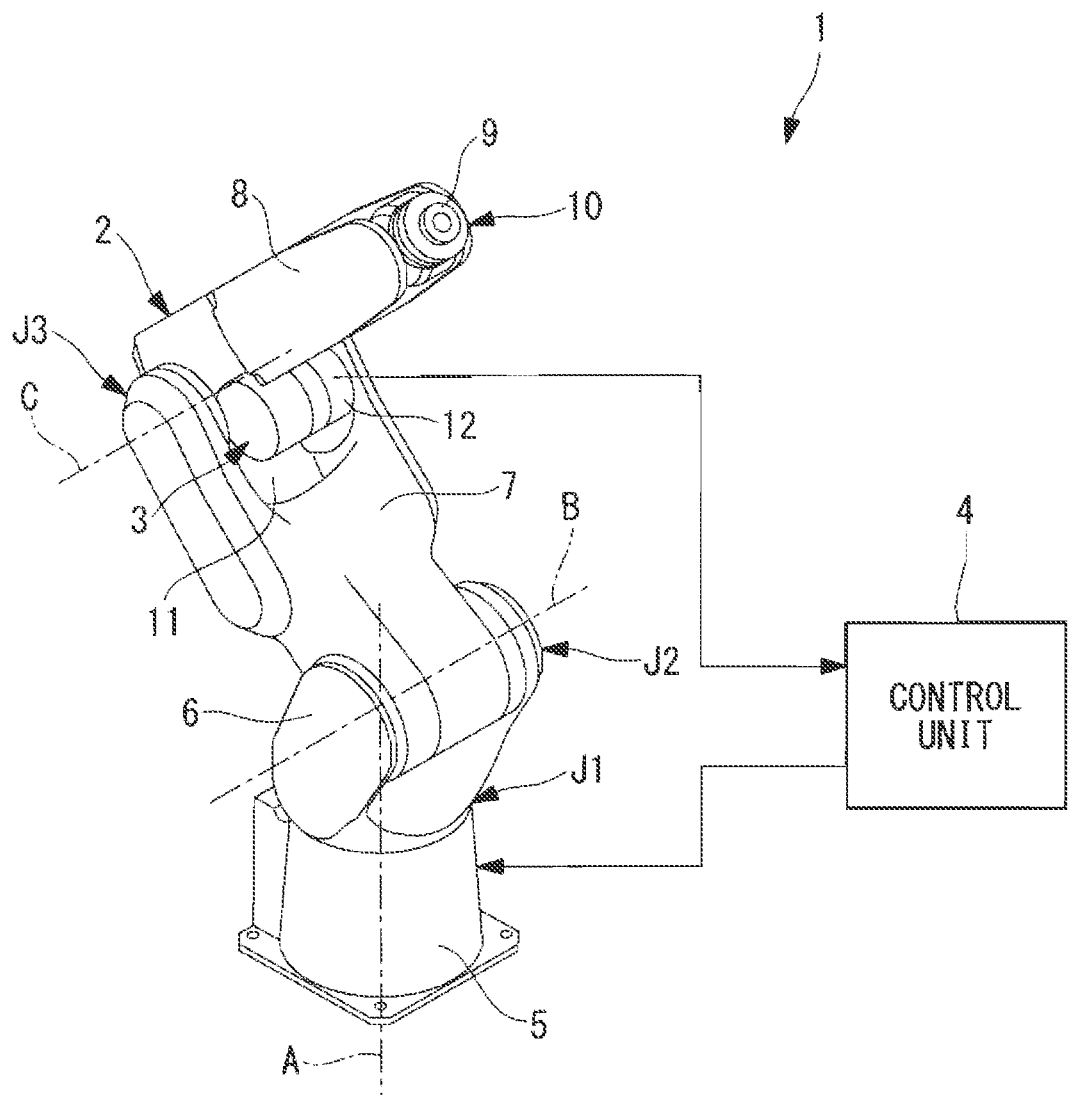
FIG. 1 is a view showing the overall configuration of a robot system according to one embodiment of the present invention.

As shown in FIG. 1, the robot system 1 of this embodiment is provided with: a robot body 2; a sensor 3 that is attached to the robot body 2; and a control unit 4 that controls the robot body 2.

In the example shown in FIG. 1, the robot body 2 is a vertical articulated robot and is provided with: a first shaft J1 that rotates a turning body 6 about a vertical first axis A with respect to a base 5 that is fixed to the floor surface; a second shaft J2 that rotates a first arm (link) 7 about a horizontal second axis B with respect to the turning body 6; a third shaft J3 that is attached to a distal end of a first arm (link) 7 and that rotates the second arm 8 about a horizontal third axis C with respect to the first arm 7; and a wrist unit 10 that is provided at the distal end of the second arm 8 and that rotates an end effector 9 provided at the distal end, about the three axes A, B, and C, which are perpendicular to each other.

Figure 2:
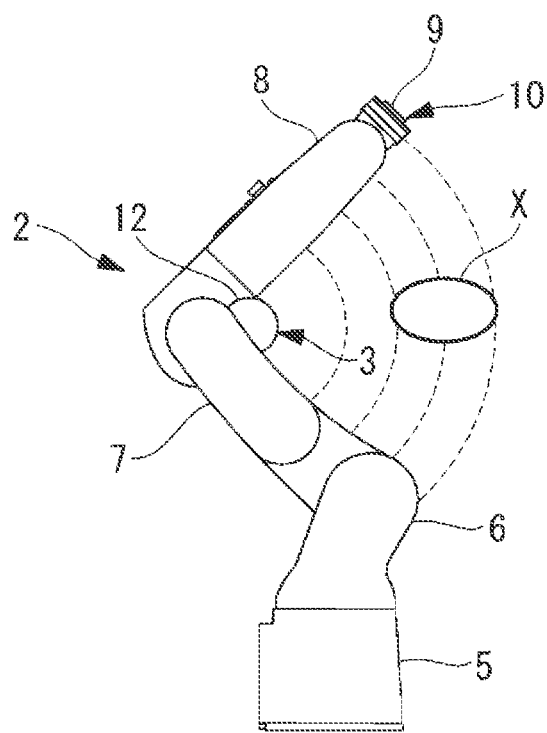
FIG. 2 is a side view for explaining a sensor that is disposed in a robot body of the robot system shown in FIG. 1.

As shown in FIG. 2, the sensor 3 is provided with a non-contact distance sensor 12 that is disposed in the vicinity of a joint that couples the first arm 7 and the second arm 8 in a manner allowing relative rotation, that radiates laser light (indicated by dashed lines in the figure) in a fan-shape manner in a space sandwiched between the first arm 7 and the second arm 8, and that detects laser light reflected at the surface of an object X entering the space, thereby measuring the distance to each position on the object X. The distance sensor 12 successively detects the object distance in a predetermined cycle during the operation of the robot body 2. As shown in FIG. 1, the distance sensor 12 is disposed at a position to be accommodated in a concave section 11 that is provided between the first arm 7 and the second arm 8, so as not to disturb the operations of the first arm 7 and the second arm 8.

Figure 3:
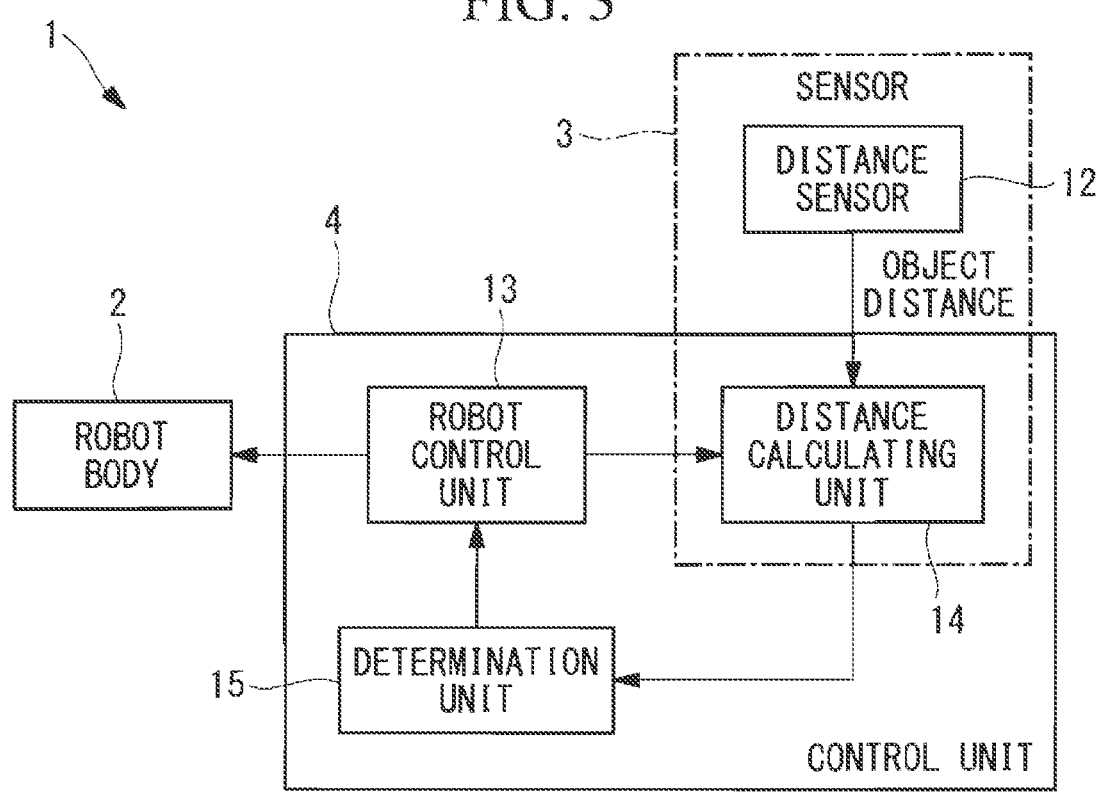
FIG. 3 is a block diagram showing a control unit in the robot system shown in FIG. 1.

As shown in FIG. 3, the control unit 4 is provided with: a robot control unit 13 that causes the robot body 2 to operate according to a taught program; and a distance calculating unit (calculation unit) 14 that calculates the distances from the opposed surfaces of the first arm 7 and the second arm 8 to the object X entering the above-described space, on the basis of the distance (object distance) from the distance sensor 12 to the object X, which is detected by the distance sensor 12, the angles of respective joints at respective operating positions, and the sizes of respective sections of the robot body 2, the sizes being stored in advance. The distance calculating unit 14 in the control unit 4 and the distance sensor 12 constitute the sensor 3.

The control unit 4 is provided with a determination unit 15 that determines whether or not the distances from the surfaces of the first arm 7 and the second arm 8 to the object X, which are calculated by the distance calculating unit 14, are less than a predetermined threshold. If the determination unit 15 determines that the above-described distances are less than the threshold, the robot control unit 13 restricts the operation of the robot body 2. Examples of operating restrictions of the robot body 2 include stopping the operation of the robot body 2, reducing the operating velocity of the robot body 2, and restricting the operating angles of the robot body 2.

The operation of the thus-configured robot system 1 of this embodiment will be described below.

According to the robot system 1 of this embodiment, as shown in FIG. 2, the distance sensor 12, which is disposed in the vicinity of the joint between the first arm 7 and the second arm 8, scans the fan-shaped space, which is defined between the first arm 7 and the second arm 8, with laser light to successively perform detection of the object X in the space therebetween.

Figure 4:
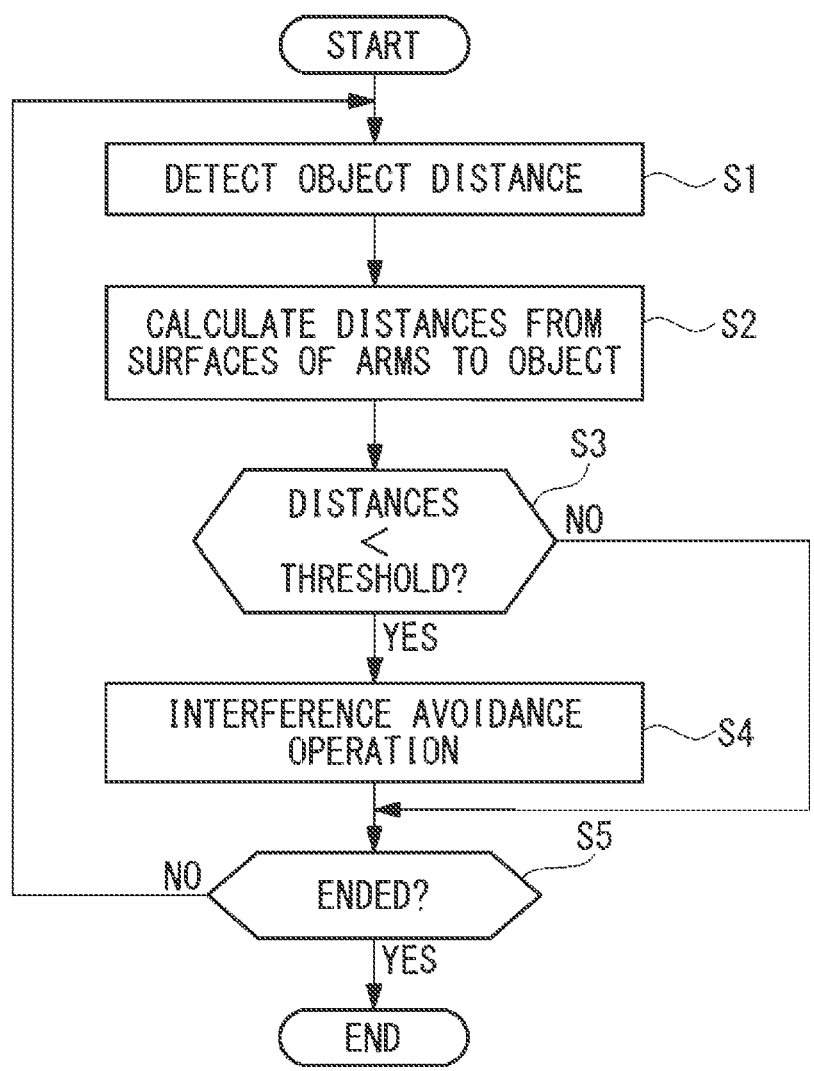
FIG. 4 is a flowchart for explaining the operation of the robot system shown in FIG. 1.

As shown in FIG. 4, when the object X enters the space, the distance sensor 12 successively detects the distance from the distance sensor 12 to the object X (Step S1).

While the robot control unit 13 causes the robot body 2 to operate according to a taught program, the angles of the joints of the respective shafts J1, J2, and J3 of the robot body 2 are successively calculated, and the distance calculating unit 14 successively calculates the distances from the opposed surfaces of the first arm 7 and the second arm 8 to the object X entering the above-described space, on the basis of the calculated angles of the respective joints and the sizes of the respective sections of the robot body 2, which are stored in advance (Step S2).

The determination unit 15 determines whether or not the distances calculated by the distance calculating unit 14 are less than the predetermined threshold (Step S3). If the calculated distances are equal to or greater than the threshold, it is determined whether the processing is continued (Step S5). If the processing is not ended, the process steps from Step S1 are repeated. If the distances calculated by the distance calculating unit 14 are less than the predetermined threshold, an interference avoidance operation in which the operation of the robot body 2 is restricted by the robot control unit 13 is performed (Step S4). After the interference avoidance operation is performed, it is determined whether the processing is continued (Step S5).

In this case, according to the robot system 1 of this embodiment, instead of detecting a load imposed on the first arm 7 or the second arm 8 by means of a torque sensor, the non-contact distance sensor 12 detects the distance to the object X located in the space between the first arm 7 and the second arm 8; thus, a possibility of interference between the object X and the first arm 7 and the second arm 8 can be detected with a high sensitivity before the occurrence of the interference.

Figure 5:
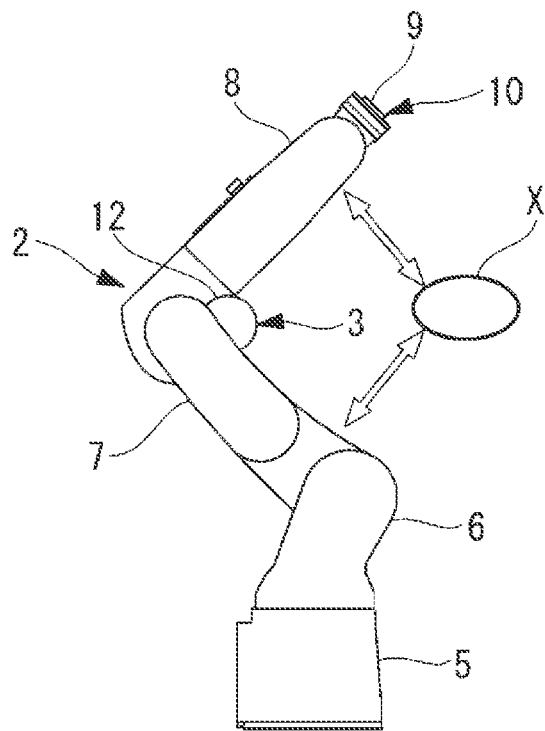
FIG. 5 is a side view showing a case where the distances from arms to an object are large in the robot system shown in FIG. 1.
Figure 6:
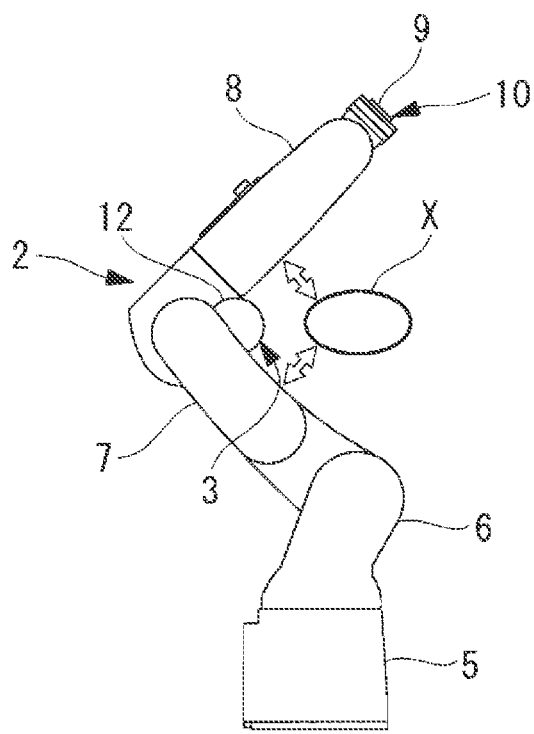
FIG. 6 is a side view showing a case where the distances from the arms to the object are small, in the same orientation of the robot body as that in FIG. 5, in the robot system shown in FIG. 1.
Figure 7:
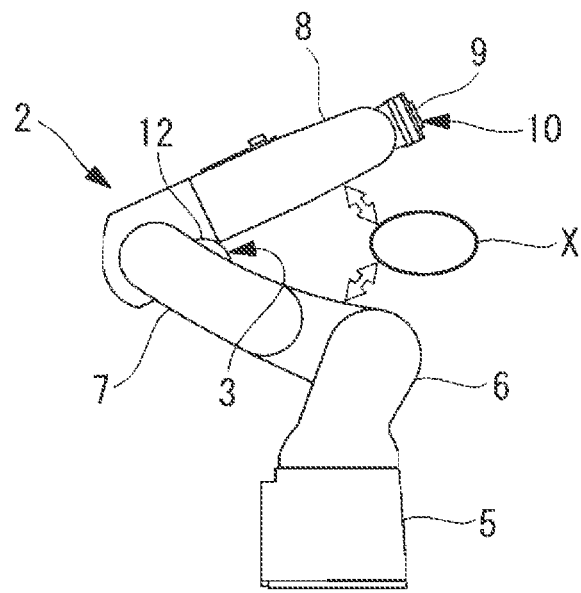
FIG. 7 is a side view showing a case where the distances from the arms to the object are the same as those in FIG. 6, in an orientation in which the relative angle between the arms is less than that in FIG. 6, in the robot system shown in FIG. 1.

The operation of the robot body 2 is restricted if the calculated distances are less than the predetermined threshold, thereby making it possible to restrict the operation of the robot body 2 in the cases shown in FIGS. 6 and 7 in which the calculated distances are small, irrespective of the relative angle between the first arm 7 and the second arm 8, as shown in FIGS. 5 to 7. Accordingly, there is an advantage in that it is possible to reduce the possibility of interference between the object X and the robot body 2 and to prevent the object X from being sandwiched between the first arm 7 and the second arm 8.

Because the operation of the robot body 2 is not restricted in the case shown in FIG. 5 in which the calculated distances are large, execution of operating restrictions at a low possibility of interference between the object X and the robot body 2 is avoided, thereby making it possible to improve the operating efficiency.

When the size of the object X is known, or when the size of the object X can be detected by the distance sensor 12, the distances from the surfaces of the first arm 7 and the second arm 8 to the object X can be accurately detected, thus making it possible to realize more reliable prevention of sandwiching.

In this embodiment, although a description has been given of an example case for preventing sandwiching between the first arm 7, which is rotatably attached to the turning body 6, and the second arm 8, which is rotatably attached to the distal end of the first arm 7, instead of this, it is also possible to apply the present invention to a case for preventing sandwiching between the turning body 6 and the first arm 7 or between the turning body 6 and the base 5. The prevent invention is not limited to a vertical articulated robot and may be applied to a horizontal articulated robot or another type of robot.

Figure 8:
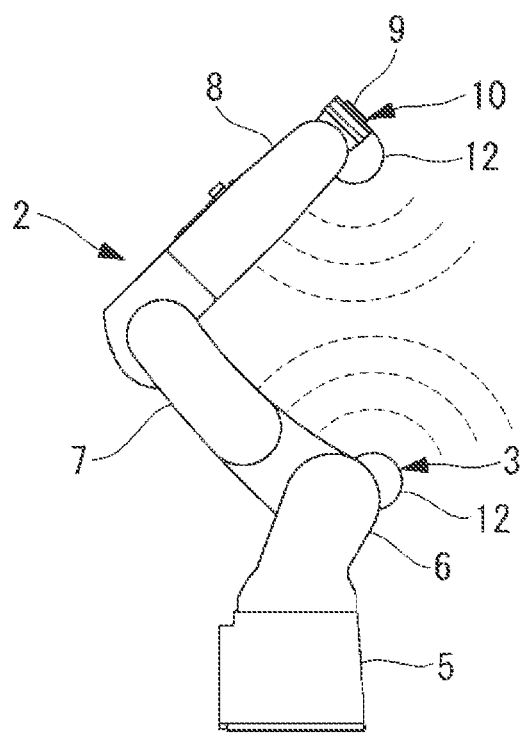
FIG. 8 is a side view of a robot body, showing a first modification of the robot system shown in FIG. 1.

In this embodiment, although the non-contact distance sensor 12, which is disposed in the vicinity of the joint between the first arm 7 and the second arm 8, measures the distance to the object X, instead of this, as shown in FIG. 8, non-contact distance sensors 12 that are provided on the first arm 7 and the second arm 8 may measure the distances to the object X. Instead of the non-contact distance sensors 12 for scanning laser light, other types of distance sensors, such as capacitance sensors, may be adopted.

Figure 9:
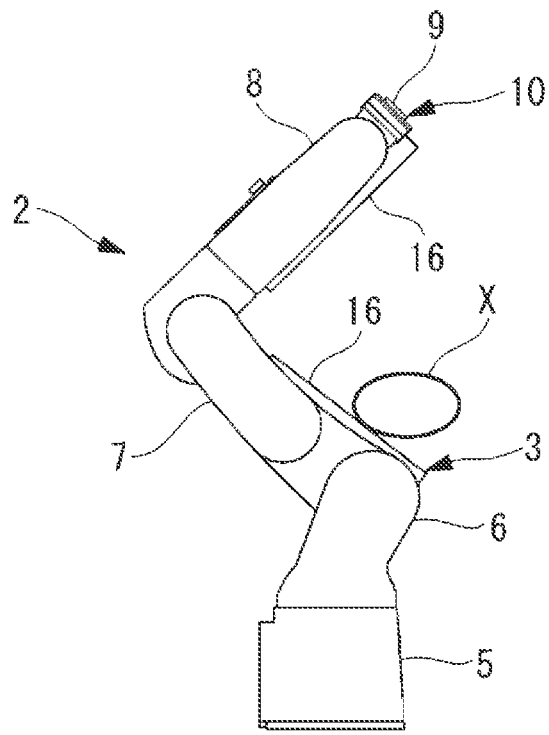
FIG. 9 is a side view of a robot body, showing a second modification of the robot system shown in FIG. 1.

Instead of the non-contact distance sensor 12, as shown in FIG. 9, contact sensors 16 may be disposed on the opposed surfaces of the first arm 7 and the second arm 8. In this case, when the object X is brought into contact with either of the sensors 16, operating restrictions of the robot body 2 are performed. Instead of providing the contact sensors 16 on both of the first arm 7 and the second arm 8, it is also possible to provide a contact sensor 16 only on the first arm 7 or only on the second arm 8 depending on the circumstances of use.

When the non-contact distance sensors 12 are provided in the vicinities of two joints and when the non-contact distance sensors 12 or the contact sensors 16 are provided on the surfaces of the first arm 7 and the second arm 8, the location of the object X can be accurately identified from two pieces of distance information, thus making it possible to realize more reliable prevention of sandwiching.

In this embodiment, it is also possible to use, as the second arm 8, an arm that has a structure in which it is rotated about the longitudinal axis thereof. In this case, the position of the surface of the second arm 8 involved in sandwiching changes about the longitudinal axis because of the orientation change of the second arm 8 due to the rotation thereof; thus, it is preferred that the non-contact distance sensor 12 or the contact sensor 16 be provided on the whole surface of the second arm 8.

When the non-contact distance sensor 12 or the contact sensor 16 is provided on the whole surface of the second arm 8, the surface of the second arm 8 involved in sandwiching can be identified by the orientation of the second arm 8 about the longitudinal axis. Therefore, it is possible to prevent false detection of sandwiching by using only sensor detection information obtained from the surface involved in sandwiching.

Figure 10:
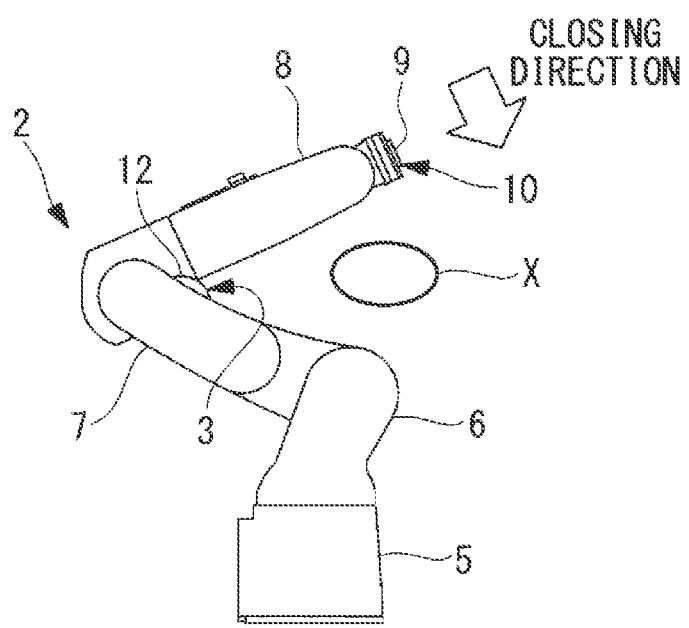
FIG. 10 is a side view showing a case where the relative angle between the arms of the robot body is reduced, according to a third modification of the robot system shown in FIG. 1.
Figure 11:
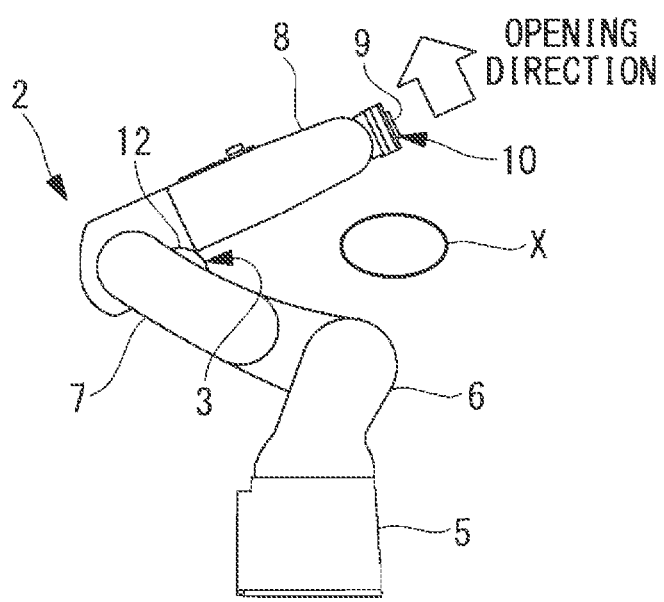
FIG. 11 is a side view showing a case where the relative angle between the arms of the robot body is increased, according to the third modification of the robot system shown in FIG. 1.
Figure 12:
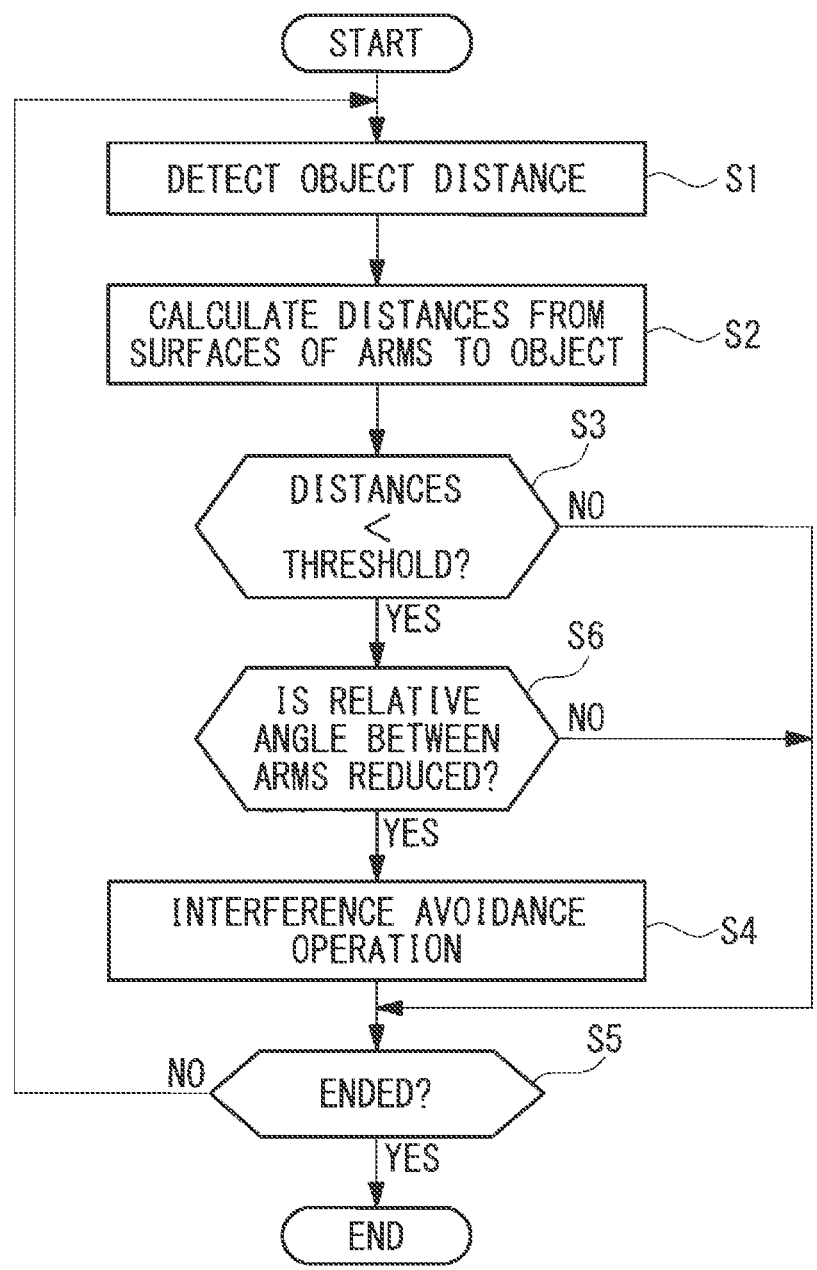
FIG. 12 is a flowchart for explaining the operation of the robot system shown in FIGS. 10 and 11.

In this embodiment, although operating restrictions of the robot body 2 are always performed if the distance from the surface of the first arm 7 and the second arm 8 to the object X, which is calculated by the distance calculating unit 14, is less than the predetermined threshold, instead of this, control may be performed such that the robot control unit 13 performs operating restrictions of the robot body 2 if the robot body 2 is moved in a direction in which the relative angle between the first arm 7 and the second arm 8 is reduced, as shown in FIG. 10, and does not perform operating restrictions thereof if the robot body 2 is moved in a direction in which the relative angle therebetween is increased, as shown in FIG. 11. In this case, as shown in FIG. 12, a determination of whether the relative angle between the first arm 7 and the second arm 8 is reduced is made (Step S6) as a condition for performing the interference avoidance operation.

By doing so, because the possibility of the occurrence of sandwiching between the first arm 7 and the second arm 8 is low when the robot body 2 is moved in a direction in which the relative angle between the first arm 7 and the second arm 8 is increased, the operation of the robot body 2 is not restricted; thus, there is an advantage in that the operating efficiency can be improved.

Figure 13:
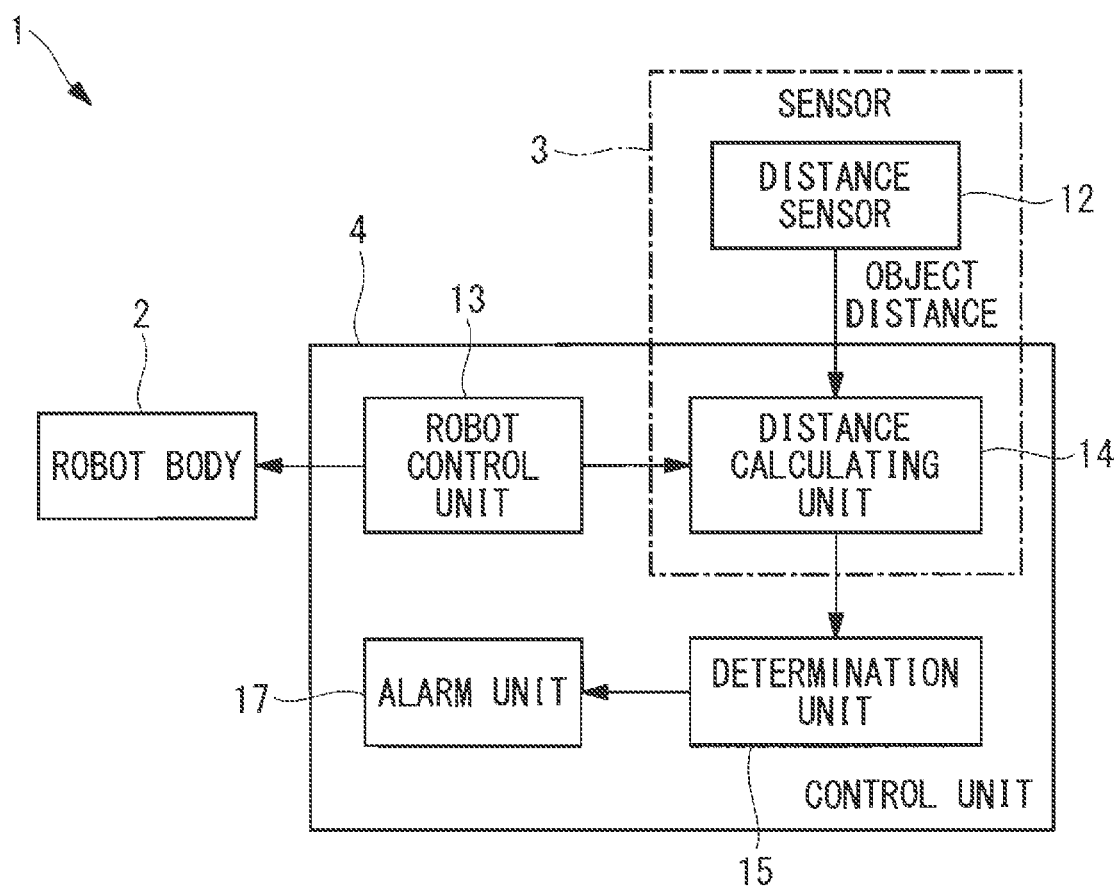
FIG. 13 is a block diagram of a control unit, showing a fourth modification of the robot system shown in FIG. 1.

According to the robot system 1 of this embodiment, although a description has been given of an example case in which operating restrictions of the robot body 2 are performed as the interference avoidance operation, as shown in FIG. 13, instead of this, or, in addition thereto, an alarm unit 17 using a lamp or sound may be provided in the control unit 4, and, if the distance to the object X from the surface of the first arm 7 or the second arm 8, which is calculated by the distance calculating unit 14, is less than the predetermined threshold, the alarm unit 17 may issue an alarm to that effect. Accordingly, an operator in the vicinity of the robot body 2 is noticed of the possibility of interference between the object X and the robot body 2 and can move the object X so as to avoid the interference therebetween.

As a result, the following aspect is read by the above described embodiment of the present invention.

According to one aspect, the present invention provides a robot system including: a robot body that is provided with at least two links that are relatively moved by at least one joint; a sensor that detects the distances from mutually opposed surfaces of the at least two links to an object inserted between the surfaces; and a control unit that performs an interference avoidance operation if the distances detected by the sensor are less than a predetermined threshold.

According to this aspect, the sensor detects the distances from the mutually opposed surfaces of two links that are relatively moved by a joint to an object inserted between the surfaces, and, if the detected distances are less than the predetermined threshold, the control unit performs an interference avoidance operation. Specifically, if the distances detected by the sensor are less than the predetermined threshold, the possibility of interference of the object, which is inserted between the links, with the links is high; thus, the interference avoidance operation is performed, thereby making it possible to prevent the object from being sandwiched between the links of the robot body. Because detection of a torque acting on the joint is not adopted, even if the object is small or is located at a position close to the joint, it is possible to detect the object with high sensitivity and to prevent the occurrence of unintentional operating restrictions of the robot body.

In the above-described aspect, the control unit may be provided with an alarm unit that issues an alarm about an approach between the links and the object, as the interference avoidance operation.

By doing so, the alarm unit issues an alarm indicating that the object is coming close to the links at distances less than the predetermined threshold, thus making it possible to cause an operator to take an action, e.g., to keep the object away from the links.

In the above-described aspect, the control unit may perform control so as to restrict the operation of the robot body, as the interference avoidance operation.

By doing so, the operation of the robot body is restricted if the object comes close to the links at distances less than the predetermined threshold, thus making it possible to reduce the possibility of interference of the robot body with the object. Examples of operating restrictions of the robot body include stopping the robot body, reducing the operating velocity of the robot body, and restricting the operating angles of the robot body.

In the above-described aspect, the control unit may perform the interference avoidance operation only when the robot body operates the joint in a direction in which the angle between the links is relatively reduced.

By doing so, the interference avoidance operation is performed only when the robot body is moved in a direction in which the distances from the links to the object are reduced, and the interference avoidance operation is not performed when the joint is operated in a direction in which the angle between the links is increased, because this direction corresponds to a direction in which the distances from the links to the object are increased. Accordingly, it is possible to effectively prevent the object from being sandwiched between the links and to prevent a reduction in the operating efficiency caused by performing an unnecessary interference avoidance operation.

In the above-described aspect, the sensor may be provided with: a non-contact distance sensor that is disposed in the vicinity of the joint and that measures the object distance to each position on the surface of the object inserted between the links; and a calculation unit that calculates the distances from the surfaces of the links to the object on the basis of the object distance detected by the distance sensor and the angle of the joint.

By doing so, the distance sensor measures the object distance from the distance sensor to the object, and the orientation of the robot body is recognized from the angle of each joint constituting the robot body; thus, the calculation unit can easily calculate the distances from the surfaces of the respective links to the object.

In the above-described aspect, the sensor may be formed of non-contact distance sensors that are attached to the surfaces of the links and that measure the distances to respective positions on the surfaces of the object inserted between the links.

By doing so, the distance sensors, which are attached to the surfaces of the links, measure the distances from the distance sensors to the object, thereby making it possible to directly detect the distances from the surfaces of the links to the object.

In the above-described aspect, the sensor may be formed of a contact sensor that is attached to the surface of at least one of the links and that detects contact with the object inserted between the links.

By doing so, when the object is brought into contact with the sensor attached to the surface of the link, the distance between the object and the link can be detected to be zero. By stopping the robot body when the object is brought into contact with the sensor attached to the surface of one of the links, the object can be prevented from being sandwiched between the links.

The invention claimed is:

1. A robot system comprising:
    a robot body that is provided with at least two links that are relatively moved by at least one joint;
    a sensor that detects the distances from mutually opposed surfaces of the at least two links to an object inserted between the surfaces; and
    a control unit that performs an interference avoidance operation if the distances detected by the sensor are less than a predetermined threshold,
    wherein the sensor disposed in the vicinity of the joint and that measures the object distance to each position on the surface of the object inserted between the links, and calculates the distances from the surfaces of the links to the object on the basis of the distance from the sensor to the surface of the object and the angle of the joint.

2. A robot system according to claim 1, wherein the control unit is provided with an alarm unit that issues an alarm about an approach between the links and the object, as the interference avoidance operation.

3. A robot system according to claim 1, wherein the control unit performs control so as to restrict the operation of the robot body, as the interference avoidance operation.

4. A robot system according to claim 1, wherein the control unit performs the interference avoidance operation only when the robot body operates the joint in a direction in which the angle between the links is relatively reduced.

5. A robot system comprising:
    a robot body that is provided with at least two links that are relatively moved by at least one joint;
    a sensor that is disposed in the vicinity of the joint and that measures the distance to the surface of the object inserted between the links; and
    a control unit that derives the distances from mutually opposed surfaces of the at least two links to an object on the basis of the distances from the sensor to the surface of the object detected by the sensor and the angle of the joint, and that performs an interference avoidance operation if the distances from the surface of the links to the object derived by the sensor are less than a predetermined threshold.

* * * * *